US008927151B2

(12) United States Patent
Moriuchi et al.

(10) Patent No.: US 8,927,151 B2
(45) Date of Patent: Jan. 6, 2015

(54) BINDER COMPOSITION FOR ELECTRODES AND ELECTRODE MIX SLURRY

(75) Inventors: Koji Moriuchi, Otsu (JP); Yasuaki Takeda, Otsu (JP)

(73) Assignee: I.S.T. Corporation, Otsu-Shi, Shiga (JP)

( * ) Notice: Subject to any disclaimer, the term of this patent is extended or adjusted under 35 U.S.C. 154(b) by 88 days.

(21) Appl. No.: 13/514,714

(22) PCT Filed: Dec. 8, 2009

(86) PCT No.: PCT/JP2009/006701
§ 371 (c)(1),
(2), (4) Date: Jun. 8, 2012

(87) PCT Pub. No.: WO2011/070610
PCT Pub. Date: Jun. 16, 2011

(65) Prior Publication Data
US 2012/0241667 A1    Sep. 27, 2012

(51) Int. Cl.
*H01M 4/13*    (2010.01)
*H01M 4/62*    (2006.01)

(52) U.S. Cl.
CPC .................................... *H01M 4/621* (2013.01)
USPC ......................................................... 429/217

(58) Field of Classification Search
CPC ...................................................... H01M 4/621
See application file for complete search history.

(56) References Cited

U.S. PATENT DOCUMENTS

2008/0124631 A1* 5/2008 Fukui et al. .................... 429/217
2009/0246632 A1* 10/2009 Fukui et al. .................... 429/217
2011/0193016 A1* 8/2011 Hirano et al. ............... 252/182.1

FOREIGN PATENT DOCUMENTS

| JP | 11-158277 | 6/1999 |
| JP | WO2004/004031 A1 | 1/2004 |
| JP | 2006-152257 A | 6/2006 |
| JP | 2006-253450 A | 9/2006 |
| JP | 2008-34352 A | 2/2008 |
| JP | 2009-238659 A | 10/2009 |
| JP | 2009-245773 A | 10/2009 |
| JP | 2009-259723 A | 11/2009 |

OTHER PUBLICATIONS

International Search Report for PCT/JP2009/006701 dated Mar. 9, 2010.
International Written Opinion for related case PCT/JP2009/006701 and translation.

* cited by examiner

*Primary Examiner* — Patrick Ryan
*Assistant Examiner* — Jose Colucci Rios
(74) *Attorney, Agent, or Firm* — Husch Blackwell LLP; Glenn H. Lenzen

(57) ABSTRACT

A binder composition for electrodes with greater binding strength that does not inhibit the formation of a stable electrode interface (SEI) on the surface of an active substance is provided. The binder composition for electrodes includes at least one type of tetracarboxylic acid ester compound, at least one type of diamine compound, and an organic solvent. Furthermore, the organic solvent preferably has a boiling point that is 250° C. or less. In addition, the organic solvent preferably has a highest occupied molecular orbital (HOMO) that is −10 eV or less.

10 Claims, No Drawings

BINDER COMPOSITION FOR ELECTRODES AND ELECTRODE MIX SLURRY

TECHNICAL FIELD

The present invention relates to a binder for electrodes and electrode mix slurry, and more specifically to a binder composition for electrodes and electrode mix slurry for a lithium ion battery.

BACKGROUND ART

Lithium ion batteries are secondary batteries that can be used repeatedly by charging, generally constituted from a cathode that includes a metal oxide such as lithium cobalt oxide ($LiCoO_2$) or the like as the cathode active material, an anode that includes a carbon material such as graphite or the like as the anode active material, and an electrolyte solution that uses solution of electrolyte in a carbonate or the like. Furthermore, in lithium ion batteries, discharging and charging can occur through the migration of lithium ions between a cathode and an anode.

Compared to batteries such as nickel batteries, nickel-hydrogen batteries and the like, lithium ion batteries have a greater energy density and a higher discharge voltage. For this reason, lithium ion batteries can be designed to be miniaturized and light-weight. Moreover, lithium ion batteries also combine advantages such as no memory effect, superior charge/discharge cycle characteristics, and the like. For this reason, lithium ion batteries have become essential for mobile devices, such as notebook computers, cellular telephones, portable game devices, digital cameras, electronic organizers, and the like, for which miniaturization and being lightweight are important product values. Recently, in addition to being miniaturized and light-weight, mobile devices become more highly functionalized with each passing year, for example, such as being equipped with One-Seg functions. For this reason, batteries with more advantages such as higher capacity and higher performance are required in mobile devices.

Thus, in recent years, the high storage/discharge capacity of lithium is expected to be useful in tin and/or tin alloy or silicon and/or silicon alloy as an anode active material for implementing higher capacity batteries. Furthermore, the anode is generally obtained by employing an anode mix slurry that contains an anode active substance and a binder to form an anode layer on the surface of an anode current collector body such as copper or the like. Here, the binder binds the active substance to another active substances or the active substance to the current collector body, and is essential for preventing detachment of the active substance from the current collector body.

In addition, examples of binder compositions used in forming a carbon material anode frequently used in industry include an N-methyl-2-pyrrolidone (NMP) solution of poly vinylidene fluoride (PVDF) and the like.

However, while PVDF is excellent as a binder that combines carbon materials to each other, it exhibits poor adhesion to a current collector body metal such as copper or the like. For this reason, carrying out repeated charging and discharging in batteries in which PVDF is employed as a binder reduces the battery capacity because the carbon materials as the active materials are detached from the current collector body. In other words, there is a problem with shortened cycle life.

Additionally, when silicon and/or silicon alloy is employed as the main component of the anode active substance, the volume of this anode active substance expands by 3- to 4-fold during charging. Consequently, when the binder used in such cases does not have sufficiently high adhesive strength as in conventional binders, cracks are produced in the active substance, which ultimately becomes finely pulverized due to the repeated expansion and contraction caused by charging/discharging. As a result, there is a problem with such batteries in that ultimately the charge-discharge cycle characteristics rapidly deteriorate.

One of the methods proposed for solving such a problem is the use of a polyimide resin as a binder (for example, see: Japan Laid-open Patent Application Publication No. JP-A-H11-158277 (1999), PCT International Application Publication No. WO 2004/004031, and the like). However, when polyimide resin is used as a binder, there is a problem that the active substance can easily become completely coated, and the formation of a stable electrode interface (SEI) on the anode surface is readily inhibited.

SUMMARY OF THE INVENTION

The object of the present invention is to offer a binder composition for electrodes with greater binding strength that does not inhibit the formation of a stable electrode interface (SEI) on the surface of an active substance. In addition, another object of the present invention is to offer an electrode mix slurry that effectively utilizes the abovementioned binder composition for electrodes.

In order to achieve the above mentioned objects and other objects of the present invention, a binder composition for electrodes is provided that basically comprises at least one type of tetracarboxylic acid ester compound, at least one type of diamine compound, and an organic solvent.

DETAILED DESCRIPTION OF THE INVENTION

Taking the results of careful research into account for solving this problem, the present inventors discovered that the abovementioned problem can be efficiently solved with a binder composition for electrodes that contains at least one type of tetracarboxylic acid ester compound, at least one type of diamine compound, and an organic solvent, and thus accomplished the present invention.

Furthermore, it is preferable that at least one type of tetracarboxylic acid ester compound in the present invention includes at least one type of tetracarboxylic acid ester compound selected from the group comprising tetracarboxylic acid ester compounds represented by chemical formula (A) below. $R^1$, $R^2$, $R^3$, $R^4$ independently represent hydrogen, a C-1 to C-8 hydrocarbon group (optionally having heteroatoms (for example, oxygen atom, nitrogen atom, sulfur atom, and the like), functional groups (for example, carbonyl group, hydroxyl group, or the like), or substituent groups (for example, an aromatic ring)), or a phenyl group. In addition, it is preferable that R' represents chemical formula (A-1) below or chemical formula (A-2) below (wherein X represents O, S, $CH_2$, $C(CH_3)_2$, CO, or a direct bond).

[Chemical Structure 1]

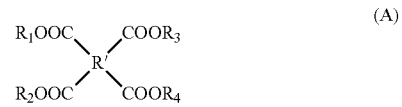

(A)

[Chemical Structure 2]

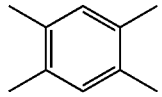
(A-1)

[Chemical Structure 3]

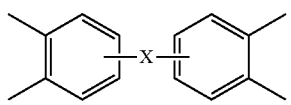
(A-2)

Additionally, the tetracarboxylic acid ester compound in the present invention can be obtained simply through the esterification of the corresponding tetracarboxylic acid or tetracarboxylic acid dianhydride with alcohols. Furthermore, this esterification is preferably carried out at a temperature of 50-150° C.

Moreover, examples of tetracarboxylic acid dianhydrides in the present invention include pyromellitic acid dianhydride (PMDA), 1,2,5,6-naphthalenetetracarboxylic acid dianhydride, 1,4,5,8-naphthalenetetracarboxylic acid dianhydride, 2,3,6,7-naphthalenetetracarboxylic acid dianhydride, 2,2',3,3'-biphenyltetracarboxylic acid dianhydride, 2,3,3',4'-biphenyltetracarboxylic acid dianhydride, 3,3',4,4'-biphenyltetracarboxylic acid dianhydride (BPDA), 2,2',3,3'-benzophenonetetracarboxylic acid dianhydride, 2,3,3',4'-benzophenonetetracarboxylic acid dianhydride, 3,3',4,4'-benzophenonetetracarboxylic acid dianhydride (BTDA), bis-(2,3-dicarboxyphenyl)methane dianhydride, bis-(3,4-dicarboxyphenyl)methane dianhydride, 1,1-bis-(2,3-dicarboxyphenyl)ethane dianhydride, 1,1-bis-(3,4-dicarboxyphenyl)ethane dianhydride, 2,2-bis-[3,4-(dicarboxyphenoxy)phenyl]propane dianhydride (BPADA), 4,4'-(hexafluoroisopropylidene)diphthalic acid anhydride, oxydiphthalic acid anhydride (ODPA), thiodiphthalic acid dianhydride, 3,4,9,10-perylenetetracarboxylic acid dianhydride, 2,3,6,7-anthracenetetracarboxylic acid dianhydride, 1,2,7,8-phenanthrolinetetracarboxylic acid dianhydride, 9,9-bis-(3,4-dicarboxyphenyl)fluorene dianhydride, 9,9-bis-[4-(3,4'-dicarboxyphenoxy)phenyl]fluorene dianhydride, and the like. Furthermore, among these tetracarboxylic acid dianhydrides, pyromellitic acid dianhydride (PMDA), 3,3',4,4'-biphenyltetracarboxylic acid dianhydride (BPDA), 3,3',4,4'-benzophenonetetracarboxylic acid dianhydride (BTDA) are preferred. Moreover, these tetracarboxylic acid dianhydrides can be used singly or in mixtures of 2 or more.

In addition, examples of alcohols for the esterification of tetracarboxylic acid dianhydrides include monovalent alcohols such as methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, 1-hexanol, 2-methyl-1-pentanol, 4-methyl-2-pentanol, 2-ethyl-1-butanol, cyclohexanol, 2-methoxyethanol, 2-ethoxyethanol, 2-(methoxymethoxy) ethanol, 2-isopropoxyethanol, 2-butoxyethanol, 2-phenylethanol, 1-phenyl-1-hydroxyethane, 2-phenoxyethanol, and the like, and polyvalent alcohols such as 1,2-ethanediol, 1,2-propanediol, 1,3-propanediol, 1,3-butanediol, 1,4-butanediol, 2,3-butanediol, 1,5-pentanediol, 2-methyl-2,4-pentanediol, 2,2'-dihydroxydiethyl ether, 2-(2-methoxyethoxy) ethanol, 2-(2-ethoxyethoxy)ethanol, 1-methoxy-2-propanol, 1-ethoxy-2-propanol, dipropylene glycol, and the like. Moreover, these alcohols can be used singly or in mixtures of 2 or more.

In addition, it is preferred that the diamine composition in the present invention preferably has at least 1 the diamine compound selected from the group comprising diamine compounds represented by Chemical Formula (B) below [wherein R" represents Chemical Formula (B-1) below or Chemical Formula (B-2) below (wherein Y represents O, S, C(CH$_3$)$_2$, CO or a direct bond)].

[Chemical Structure 4]

$$H_2N - R'' - NH_2 \quad (B)$$

[Chemical Structure 5]

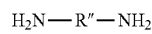
(B-1)

[Chemical Structure 6]

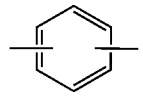
(B-2)

Additionally, examples of diamine compounds in the present invention may include para-phenylenediamine (PPD), meta-phenylenediamine (MPDA), 2,5-diaminotoluene, 2,6-diaminotoluene, 4,4'-diaminobiphenyl, 3,3'-dimethyl-4,4'-diaminobiphenyl, 3,3'-dimethyl-4,4'-diaminobiphenyl, 3,3'-dimethoxy-4,4'-diaminobiphenyl, 2,2'-bis (trifluoromethyl)-4,4'-diaminobiphenyl, 3,3'-diaminodiphenylmethane, 4,4'-diaminodiphenylmethane (MDA), 2,2-bis-(4-aminophenyl)propane, 3,3'-diaminodiphenylsulfide, 4,4'-diaminodiphenylsulfide, 3,3'-diaminodiphenyl ether, 3,4'-diaminodiphenyl ether (34ODA), 4,4'-diaminodiphenyl ether (ODA), 1,5-diaminonaphthalene, 4,4'-diaminodiphenyldiethylsilane, 4,4'-diaminodiphenylsilane, 4,4'-diaminodiphenylethylphosphine oxide, 1,3-bis-(3-aminophenoxy)benzene (133APB), 1,3-bis-(4-aminophenoxy)benzene (134APB), 1,4-bis-(4-aminophenoxy) benzene, 2,2-bis-[4-(4-aminophenoxy)phenyl]propane (BAPP), 2,2-bis-(3-aminophenyl)-1,1,1,3,3,3-hexafluoropropane, 2,2-bis-(4-aminophenyl)-1,1,1,3,3,3-hexafluoropropane, 9,9-bis-(4-aminophenyl)fluorine, and the like. Furthermore, among these diamine compounds, para-phenylenediamine (PPD), meta-phenylenediamine (MPDA), 4,4'-diaminodiphenylmethane (MDA), 3,4'-diaminodiphenyl ether (34ODA), 4,4'-diaminodiphenyl ether (ODA), 1,3-bis-(3-aminophenoxy)benzene (133APB), 1,3-bis-(4-aminophenoxy)benzene (134APB), and 2,2-bis-[4-(4-aminophenoxy) phenyl]propane (BAPP) are preferred. Moreover, these diamine compounds can be used singly or in mixtures of 2 or more.

In addition, the number of moles of the diamine compound in the present invention is preferably equal to or greater than the number of moles of the tetracarboxylic acid ester compound. In other words, the number of molecules of the diamine compound is preferably greater than the number of molecules of the tetracarboxylic acid ester compound. For example, when the tetracarboxylic acid ester compound is BTDA, the reaction of the diamine compound with the carbonyl groups of BTDA becomes easier with the result that 3-dimensional cross-links are formed from the BTDA and the diamine compound, which is suitable for relieving the stresses from the expansion and contraction of the anode active substance.

Additionally, in the present invention, the organic solvent can be an organic solvent that dissolves tetracarboxylic acid ester compound and diamine compound, and preferably has a boiling point at or below 250° C., and more preferably has a boiling point at or below 225° C. In the case that the organic solvent has a boiling point at or below 250° C., residual organic solvent is then unlikely to be left on the electrode.

Furthermore, examples of such organic solvents may include monovalent alcohols such as methanol (boiling point 65° C.), ethanol (boiling point 78° C.), 1-propanol (boiling point 97° C.), 2-propanol (boiling point 82° C.), 1-butanol (boiling point 118° C.), 2-butanol (boiling point 100° C.), 2-methyl-1-propanol (boiling point 108° C.), 2-methyl-2-propanol (boiling point 83° C.), 1-pentanol (boiling point 138° C.), 2-pentanol (boiling point 119° C.), 3-pentanol (boiling point 116° C.), 2-methyl-1-butanol (boiling point 128° C.), 3-methyl-1-butanol (boiling point 131° C.), 2-methyl-2-butanol (boiling point 102° C.), 3-methyl-2-butanol (boiling point 112° C.), 2,2-dimethyl-1-propanol (boiling point 114° C.), 1-hexanol (boiling point 157° C.), 2-methyl-1-pentanol (boiling point 148° C.), 4-methyl-2-pentanol (boiling point 132° C.), 2-ethyl-1-butanol (boiling point 147° C.), cyclohexanol (boiling point 161° C.), 2-methoxyethanol (boiling point 125° C.), 2-ethoxyethanol (boiling point 136° C.), 2-isopropoxyethanol (boiling point 139-143° C.), 2-butoxyethanol (boiling point 170° C.), 2-phenylethanol (boiling point 220° C.), 2-phenoxyethanol (boiling point 245° C.), and the like; polyvalent alcohols such as 1,2-ethanediol (boiling point 198° C.), 1,2-propanediol (boiling point 187° C.), 1,3-propanediol (boiling point 214° C.), 1,3-butanediol (boiling point 191° C.), 1,4-butanediol (boiling point 229° C.), 2,3-butanediol (boiling point 182° C.), 1,5-pentanediol (boiling point 242° C.), 2-methyl-2,4-pentanediol (boiling point 197° C.), 2,2'-dihydroxydiethyl ether (boiling point 245° C.), 2-(2-methoxyethoxy)ethanol (boiling point 194° C.), 2-(2-ethoxyethoxy)ethanol (boiling point 202° C.), 1-methoxy-2-propanol (boiling point 120° C.), 1-ethoxy-2-propanol (boiling point 132° C.), dipropylene glycol (boiling point 232° C.), and the like; ethers such as 1,2-dimethoxyethane (monoglyme, boiling point 85° C.), 1,2-diethoxyethane (boiling point 121° C.), 1,2-dibutoxyethane (boiling point 203° C.), bis-(2-methoxyethyl) ether (diglyme, boiling point 160° C.), bis-(2-ethoxyethyl) ether (boiling point 188° C.), tetrahydrofuran (boiling point 66° C.), dioxane (boiling point 101° C.), and the like; carboxylic acid esters such as ethyl acetate (boiling point 77° C.), propyl acetate (boiling point 102° C.), butyl acetate (boiling point 126° C.), γ-butyrolactone (boiling point 204° C.), and the like; and carbonate esters such as dimethyl carbonate (boiling point 90° C.), ethyl methyl carbonate (boiling point 107° C.), diethyl carbonate (boiling point 126° C.), ethylene carbonate (boiling point 238° C.), propylene carbonate (boiling point 242° C.), butylene carbonate (boiling point 240° C.), and the like. Moreover, these organic solvents can be used singly or in mixtures of 2 or more.

In addition, the organic solvent preferably has a highest occupied molecular orbital (HOMO) that is −10 eV or less. When the highest occupied molecular orbital (HOMO) of the organic solvent is −10 eV or less, the organic solvent is unlikely to be oxidized by the high electromotive force in the lithium ion, so that no problems will arise if by some chance there is residual organic solvent in the electrode mix layer. Furthermore, in the present patent, the value for the highest occupied molecular orbital (HOMO) was determined using the MOPAC (ver. 6 PM3) software program based on the semiempirical molecular orbital method.

Furthermore, examples of such organic solvents include alcohols such as methanol (boiling point 65° C., HOMO −11.04 eV) and ethanol (boiling point 78° C., HOMO −11.13 eV), and the like; ethers such as 1,2-dimethoxyethane (monoglyme, boiling point 85° C., HOMO −10.59 eV), 1,2-diethoxyethane (boiling point 121° C., HOMO −10.50 eV), bis-(2-methoxyethyl) ether (diglyme, boiling point 160° C., HOMO −10.58 eV), bis-(2-ethoxyethyl) ether (boiling point 188° C., HOMO −10.54 eV), tetrahydrofuran (boiling point 66° C., HOMO −10.26 eV), dioxane (boiling point 101° C., HOMO −10.45 eV), and the like; carboxylic acid esters such as ethyl acetate (boiling point 77° C., HOMO −11.25 eV), propyl acetate (boiling point 102° C., HOMO −11.25 eV), butyl acetate (boiling point 126° C., HOMO −11.25 eV), γ-butyrolactone (boiling point 204° C., HOMO −11.17 eV), and the like; and carbonate esters such as dimethyl carbonate (boiling point 90° C., HOMO −11.62 eV), ethyl methyl carbonate (boiling point 107° C., HOMO −11.51 eV), diethyl carbonate (boiling point 127° C., HOMO −11.45 eV), ethylene carbonate (boiling point 238° C., HOMO −11.78 eV), propylene carbonate (boiling point 242° C., HOMO −11.69 eV), butylene carbonate (boiling point 240° C., HOMO −11.68 eV), and the like. Moreover, these organic solvents can be used singly or in mixtures of 2 or more.

In addition, there is no particular limitation on the ratio of the solids content of the binder composition for electrodes of the present invention, but it is preferred that the ratio is higher, because, in the manufacture of the electrode mix slurry, it can reduce the amount of solvent and the concentration can be adjusted. Furthermore, the ratio of the solids content of the binder composition for electrodes is preferably 10 wt % or more, more preferably 20 wt % or more, and further preferably 30 wt % or less.

Additionally, the electrode mix slurry of the present invention is obtained by blending an active substance into the binder composition for electrodes of the present invention.

Moreover, there is no particular limitation on the anode active substance that can be blended into the electrode mix slurry of the present invention, but examples include graphite, mesocarbon microbeads (MCMB), tin and/or tin alloy, silicon and/or silicon alloy, and the like. Furthermore, when the anode active substance is an alloy, materials alloyed with lithium can be contained in this anode active substance. Furthermore, examples of materials that are alloyed with lithium include germanium, tin, lead, zinc, magnesium, sodium, aluminum, gallium, indium, alloys thereof, and the like. However, to increase the battery capacity in the anode, the anode active substance on the anode is preferably silicon and/or a silicon alloy, and more preferably is silicon. In addition, examples of the cathode active substances include lithium-containing transition metal oxides such as $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$ and the like, or non-lithium-containing metal oxides such as $MnO_2$ and the like, and the like.

Furthermore, while there is no particular limitation on the mean particle diameter when the anode active substance is a particulate, it is preferably ≥10 μm and ≤20 μm. If the particle diameter of the anode active substance particulate is too small, the surface area per unit weight of the anode active substance particulate is increased, the contact area with the non-aqueous electrolyte increase, and an increase in the irreversible reaction will lead to decreased capacity. On the other hand, if the particle diameter of the anode active substance particulate is too large, the resistance between the anode active substance particulate and the anode current collector body is reduced, and the stresses due to volume changes in the anode active substance particulate during charging/discharging cause the anode active substance to detach from the anode current collector body.

Furthermore, if the amount of binder is too little in the electrode mix slurry relating to the present invention, it is difficult to maintain adequate anode active substance on the anode surface and adequately enhance the adhesiveness between the anode layer and the anode current collector body. On the other hand, if the amount of binder is too large, it is difficult to charge during the early stage because the resistance of the anode increases. For these reasons, the amount of binder with respect to the active substance is preferably ≥5 wt % and ≤50 wt %.

Additionally, to improve the current collecting characteristics in the anode, a conductive powder can be added to the anode mix slurry. Here, preferably, a conductive powder includes a conductive carbon material or a conductive metal that is the almost same as that of the anode current collector body described below. Furthermore, examples of conductive carbon materials include graphite, artificial graphite such as MCMB, carbon nanochips, and the like. Moreover, examples of conductive metals include metals such as copper, nickel, iron, titanium, cobalt and the like, and alloys thereof.

In addition, there is no particular limitation regarding the viscosity of the anode mix slurry relating to the present invention, but it is preferably ≥1 poise and ≤500 poise. This makes application easier, for example, to a copper foil.

In the present invention, the surface roughness (Ra) of the anode current collector body is preferably ≥0.1 µm. In this way, when an anode layer is formed on an anode current collector body with a surface roughness (Ra) of ≥0.1 µm, a greater anchoring efficiency of the binder on the anode layer is obtained, and the adhesiveness between this anode layer and the anode current collector body is greatly increased.

Additionally, examples of the material of this anode current collector body include metals such as copper, nickel, iron, titanium, cobalt or alloys thereof, and in particular, metal foils that contain the element copper are preferred, and further preferred are copper foil and copper alloy foil. Moreover, as the metal foil that contains elemental copper, a layer containing the elemental copper can also be formed on the surface of a metal foil comprising a metallic element other than copper.

In addition, while there is no particular limitation on the thickness of the abovementioned anode current collector body, it is normally in the range of 10-100 µm.

Additionally, while there is no particular limitation regarding the method for coating the electrode mix slurry relating to the present invention onto the current collector body, the die-coating method is preferred. Furthermore, after die-coating, the electrode mix slurry is dried until it can be roll milled, and after bring formed into the anode mix layer, the electrode mix layer formed on the anode current collector body is roll milled. Furthermore, when the anode mix layer undergoes rolling in this manner, along with increasing the energy density of the battery by increasing the density of the anode mix layer, some of the anode active substance particles are embedded in the anode current collector body, and the adhesive surface area between the anode mix layer and the anode current collector body will be increased. This results in an increase in the adhesiveness of the anode mix layer toward the anode current collector body, so that the anode mix layer also adheres sufficiently to the anode current collector body without roughening of the surface.

Moreover, when a sintering treatment is carried out in the present invention, the temperature of this process is preferably 200-500° C., and further preferably 300 450° C. These ranges are sufficient for the tetracarboxylic acid ester compound and the amine compound in the binder compound for electrodes to be converted into a polyimide. Moreover, this sintering process is preferably carried out under any type of non-oxidizing atmosphere. Furthermore, examples of non-oxidizing atmospheres include inert gases atmosphere such as argon or the like, a nitrogen gas atmosphere, and a vacuum atmosphere. In addition, the abovementioned sintering can be conducted under a reducing atmosphere such as a hydrogen gas atmosphere. Additionally, among such atmospheres, inert atmosphere gases such as argon or the like are preferred. Examples of the sintering method include the discharge plasma sintering method or a hot pressing method. Furthermore, when the anode in the present invention undergoes a sintering process, depending on the sintering process, the elements of the current collector body may diffuse into the active substance particles of the active substance layer. When elemental copper is contained in the current collector body surface, the elemental copper of the current collector body can diffuse into the active substance particles, and this can increase the adhesiveness between the current collector body and the active substance layer.

The binder composition for electrodes relating to the present invention is not of the polymer-containing-type such as an N-methyl-2-pyrrolidone (NMP) solution of poly vinylidene fluoride (PVDF) or aqueous dispersion of styrene-butadiene rubber (SBR), but is a monomer-containing type that contains a tetracarboxylic acid ester compound and a diamine compound. In other words, during the heating or sintering of the binder composition for electrodes, heat is applied to the binder composition for electrodes, which brings about the imidification reaction of a tetracarboxylic acid ester compound and a diamine compound. During this imidification reaction, the alcohol which is side product is gradually removed by evaporation. For this reason, an appropriate number of holes are expected to form in the anode layer. Consequently, the binder is expected not to cover the active substance completely to the point that the electrolyte cannot come into contact with the active substance. Thus, there is less concern about inhibition of the formation of a stable electrode interface (SEI) on the active substance surface when the present binder composition for electrodes is used. Moreover, according to the present inventors, it is confirmed that a composition including a tetracarboxylic acid ester compound, a diamine compound, and an organic solvent has superiority regarding the adhesiveness of the active material to other active materials and to the current collector body. Thus, the binder composition for electrodes relating to the present invention does not inhibit the formation of a stable electrode interface (SEI) on the active material surface, and the active material can adhere tightly to other active materials and to the current collector body.

In addition, as mentioned above, if an appropriate number of holes form in the anode layer, even though the anode active substance can readily expand and contract during charging and discharging, the stresses on the binder that arise with expansion and contraction can be relieved. For this reason, if this binder composition for electrodes is used, even though the anode active substance will readily expand and contract during charging and discharging, the rapid deterioration in battery performance can be suppressed.

Additionally, in the binder composition for electrodes relating to the present invention, when the organic solvent used has a boiling point of 250° C. or less, the organic solvent is unlikely to leave residues on the anode layer. For this reason, when such binder compositions for electrodes are used, problems such as self-discharge can be prevented beforehand.

Moreover, when the binder composition for electrodes relating to the present invention employs an organic solvent with a highest occupied molecular orbital (HOMO) having a value of −10 eV or less, the organic solvent is unlikely to undergo oxidation or reduction. For this reason, there will be no problems, even though, by some chance, organic solvent residues are present on the anode layer.

In addition, this binder composition for electrodes can easily be thickened by adjusting the ratio of the solids content. For this reason, it is not necessary to add thickeners or the like. Consequently, it is not necessary to add something, such as thickners, which causes problems when it stays in the anode layer. The problems may include reduction in battery capacity and the like.

EXAMPLES

The present invention is explained below in further detail using working examples.

Working Example 1

The synthesis vessel was constituted from a 500 mL 3-neck flask equipped with a stirring rod which was fitted with a polytetrafluoroethylene stir paddle. This synthesis vessel was charged with 39.77 g (0.123 mol) of 3,3',4,4'-benzophenonetetracarboxylic acid dianhydride (BTDA) and 45.55 g of ethanol (boiling point: 78° C.; HOMO: −11.13 eV), and these contents were stirred for 3 hours with heating to 60° C. to yield a solution of BTDA ester compound. Afterwards, 14.68 g (0.136 mol) of metaphenylene diamine (MPDA) was added to the synthesis vessel, giving a 1:1.1 molar ratio of the BTDA ester compound:MPDA, and these contents were further stirred for 1 hour with heating to 60° C. to prepare a binder composition for electrodes. Furthermore, the viscosity of this binder composition for electrodes was 3 poise. Next, an electrode mix slurry was prepared by adding silicon powder to the binder composition for electrodesin order that a binder composition for electrodes has 10 wt % of silicon powder. Afterwards, once this electrode mix slurry was coated onto 18-µm thick rolled copper foil (Nihon Copper Foil) and dried, this rolled copper foil was compression molded using a roller press machine. Subsequently, this rolled copper foil was heated at 400° C. for 6 hours under a vacuum atmosphere to form a mix layer on the rolled copper foil. At this time, the polyimide in the mix layer was firmly fixed to the copper foil.

Working Example 2

A binder composition for electrodes was prepared in the same manner as in Working Example 1, except that the BTDA ester compound:MPDA molar ratio was 1:1.05. The viscosity of this binder composition for electrodes was 3 poise. Moreover, the electrode mix slurry and mix layer were formed in the same manner as in Working Example 1. At this time, the polyimide in the mix layer was firmly fixed to the copper foil.

Working Example 3

A binder composition for electrodes was prepared in the same manner as in Working Example 1, except that the 45.55 g of ethanol was replaced by the mixture 28.50 g of diglyme (boiling point: 160° C.; HOMO: −10.58 eV) and 17.06 g of ethanol. The viscosity of this binder composition for electrodes was 25 poise. Moreover, the electrode mix slurry and mix layer were formed in the same manner as in Working Example 1. At this time, the polyimide in the mix layer was firmly fixed to the copper foil.

Working Example 4

A binder composition for electrodes was prepared in the same manner as in Working Example 3, except that the ratio of the solids content was 20 wt % instead of 50 wt %, that the amount of MPDA added was replaced with 5.87 g (0.0543 mol), that the amount of added ethanol was replaced with 6.82 g (0.148 mol), and that the 28.50 g of diglyme was replaced with 71.40 g of γ-butyrolactone (boiling point: 204° C.; HOMO: −11.17 eV). The viscosity of this binder composition for electrodes was 20 poise. Moreover, the electrode mix slurry and mix layer were formed in the same manner as in Working Example 1. At this time, the polyimide in the mix layer was firmly fixed to the copper foil.

Working Example 5

A binder composition for electrodes was prepared in the same manner as in Working Example 2, except that the ratio of the solids content was 30 wt % instead of 50 wt %, that the amount of BTDA added was replaced with 13.48 g (0.0418 mol), that the MPDA was replaced with 18.03 g (0.0439 mol) of 2,2-bis-[4-(4-aminophenoxy)phenyl]propane (BAPP), and that the 45.55 g of ethanol was replaced with 68.49 g of 2-ethoxyethanol (boiling point: 136° C.; HOMO: −10.67 eV). The viscosity of this binder composition for electrodes was 0.7 poise. Moreover, the electrode mix slurry and mix layer were formed in the same manner as in Working Example 1. At this time, the polyimide in the mix layer was firmly fixed to the copper foil.

Working Example 6

A binder composition for electrodes was prepared in the same manner as in Working Example 2, except that the ratio of the solids content was 40 wt % instead of 50 wt %, that the 39.77 g of BTDA was replaced with 17.08 g (0.0580 mol) of 3,3',4,4'-biphenyltetracarboxylic acid dianhydride (BPDA), that the MPDA was replaced with 25.02 g (0.0609 mol) of BAPP, and that the 45.55 g of ethanol was replaced with a mixture of 49.89 g of diglyme and 8.02 g (0.174 mol) of ethanol. The viscosity of this binder composition for electrodes was 200 poise. Moreover, the electrode mix slurry and mix layer were formed in the same manner as in Working Example 1. At this time, the polyimide in the mix layer was firmly fixed to the copper foil.

The binder composition for electrodes relating to the present invention has the characteristics of higher adhesiveness which does not inhibit the formation of a stable electrode interface (SEI) on the active substance surface, and in particular is effective as a binder composition for forming an anode electrode in lithium batteries.

The invention claimed is:
1. A monomeric binder composition for electrodes, consisting of: at least one type of tetracarboxylic acid ester compound; at least one type of diamine compound, the number of moles of the diamine compound being equal to or greater than the number of moles of the tetracarboxylic acid ester compound; and an organic solvent, thereby providing the monomeric binder composition.

2. A monomeric binder composition for electrodes, comprising: at least one type of tetracarboxylic acid ester compound; at least one type of diamine compound, the number of moles of the diamine compound being equal to or greater than the number of moles of the tetracarboxylic acid ester compound; and an organic solvent, thereby providing the monomeric binder composition.

3. The binder composition for electrodes as recited in claim 1 or 2, wherein the at least one type of the tetracarboxylic acid ester compound is at least one type of tetracarboxylic acid ester compound selected from the group comprising tetracarboxylic acid ester compounds represented by Chemical Formula A below, wherein $R_1$, $R_2$, $R_3$, $R_4$ independently represent hydrogen, a C-1 to C-8 hydrocarbon group having heteroatoms, functional groups or substituent groups, or a phenyl group, R' represents Chemical Formula A-1 below or Chemical Formula A-2 below, and wherein X represents O, S, $CH_2$, $C(CH_3)_2$, CO, or a direct bond

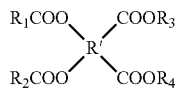
(A)

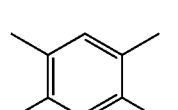
(A-1)

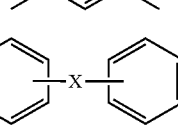
(A-2)

4. The binder composition for electrodes as recited in claim 1 or 2, wherein the at least one type of the diamine compound is selected from the group comprising diamine compounds represented by Chemical Formula (B) below wherein R" represents Chemical Formula (B-1) below or Chemical Formula (B-2) below and wherein Y represents O, S, $C(CH_3)_2$, CO, or a direct bond

(B)

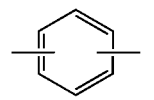
(B-1)

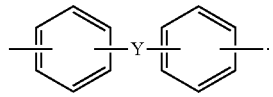
(B-2)

5. The binder composition for electrodes as recited in claim 1 or 2, wherein the organic solvent has a boiling point of 250° C. or less.

6. The binder composition for electrodes as recited in claim 1 or 2, wherein the highest occupied molecular orbital (HOMO) of the organic solvent is −10 eV or less, based on the semiempirical molecular orbital method.

7. The binder composition for electrodes as recited in claim 1 or 2, wherein the highest occupied molecular orbital (HOMO) of the organic solvent is −10.5 eV or less, based on the semiempirical molecular orbital method.

8. The binder composition for electrodes as recited in claim 1 or 2, wherein the organic solvent being at least one selected from group consisting of methanol, ethanol, 1,2-dimethoxyethane, 1,2-diethoxyethane, bis-(2-methoxyethyl)ether, bis-(2-ethoxyethyl)ether, tetrahydrofuran, dioxane, ethyl acetate, propyl acetate, butyl acetate, γ-butyrolactone, dimethyl carbonate, ethyl methyl carbonate, diethyl carbonate, ethylene carbonate, propylene carbonate, and butylene carbonate.

9. The binder composition for electrodes as recited in claim 1 or 2, wherein the organic solvent being at least one selected from group consisting of methanol, ethanol, 1,2-diethoxyethane, bis-(2-ethoxyethyl)ether, ethyl acetate, propyl acetate, butyl acetate, dimethyl carbonate, ethyl methyl carbonate, diethyl carbonate, ethylene carbonate, propylene carbonate, and butylene carbonate.

10. An electrode mix slurry, comprising: the binder composition for electrodes as recited in claim 1 or 2; and an active substance mixed into the binder composition for electrodes.

* * * * *